(12) United States Patent
Iida et al.

(10) Patent No.: US 12,198,834 B2
(45) Date of Patent: *Jan. 14, 2025

(54) RESIN COMPOSITION AND MOULDED ARTICLE

(71) Applicant: DAIKIN INDUSTRIES, LTD., Osaka (JP)

(72) Inventors: Junya Iida, Osaka (JP); Koji Nakanishi, Osaka (JP); Ayane Nakaue, Osaka (JP); Hideki Kono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 443 days.

This patent is subject to a terminal disclaimer.

(21) Appl. No.: 15/516,959

(22) PCT Filed: Sep. 29, 2015

(86) PCT No.: PCT/JP2015/077551
§ 371 (c)(1),
(2) Date: Apr. 5, 2017

(87) PCT Pub. No.: WO2016/056431
PCT Pub. Date: Apr. 14, 2016

(65) Prior Publication Data
US 2017/0301430 A1    Oct. 19, 2017

(30) Foreign Application Priority Data
Oct. 10, 2014    (JP) .................................. 2014-209140

(51) Int. Cl.
| H01B 3/44 | (2006.01) |
| C08L 27/12 | (2006.01) |
| C08L 27/18 | (2006.01) |
| C08L 27/20 | (2006.01) |
| C08L 29/10 | (2006.01) |
| C08L 71/00 | (2006.01) |
| C08L 71/10 | (2006.01) |

(52) U.S. Cl.
CPC .............. *H01B 3/445* (2013.01); *C08L 27/12* (2013.01); *C08L 27/18* (2013.01); *C08L 27/20* (2013.01); *C08L 29/10* (2013.01); *C08L 71/00* (2013.01); *C08L 71/10* (2013.01); *C08G 2650/40* (2013.01)

(58) Field of Classification Search
CPC ..... C08G 2650/40; H01B 3/445; C08L 71/00; C08L 27/12; C08L 27/18; C08L 27/20; C08L 29/10; C08L 71/10
See application file for complete search history.

(56) References Cited

U.S. PATENT DOCUMENTS

| 4,001,351 A * | 1/1977 | Roura ...................... C08J 3/005 525/197 |
| 4,320,224 A | 3/1982 | Rose et al. |
| 4,748,227 A | 5/1988 | Matzner et al. |
| 5,789,508 A * | 8/1998 | Baker ..................... C08F 14/26 526/225 |
| 7,837,896 B2 * | 11/2010 | Flath ....................... C08L 71/10 252/299.1 |
| 2005/0137671 A1 * | 6/2005 | Liu ....................... A61N 1/0568 607/122 |
| 2005/0281498 A1 | 12/2005 | Hayashi et al. |
| 2009/0044965 A1 * | 2/2009 | Kono ...................... C08L 27/18 174/110 SR |
| 2011/0272173 A1 | 11/2011 | Shiotsuki et al. |
| 2013/0109810 A1 | 5/2013 | Xie et al. |
| 2015/0203679 A1 | 7/2015 | Ueda et al. |
| 2015/0259525 A1 | 9/2015 | Mutsuda et al. |

FOREIGN PATENT DOCUMENTS

| GB | 2 412 915 A | 10/2005 |
| JP | 54-90296 A | 7/1979 |
| JP | 59-093724 A | 5/1984 |
| JP | 63-006023 A | 1/1988 |
| JP | 2010-539252 A | 12/2010 |
| WO | 2012/005133 A1 | 1/2012 |
| WO | 2014/024671 A1 | 2/2014 |
| WO | 2014/034493 A1 | 3/2014 |

OTHER PUBLICATIONS

Engineering Toolbox, Absolute, Dynamic and Kinematic Viscosity, retrieved Dec. 10, 2016, pp. 1-8, http://www.engineeringtoolbox.com/dynamic-absolute-kinematic-viscosity-d_412.html.*
International Search Report for PCT/JP2015/077551 dated Dec. 28, 2015 [PCT/ISA/210].
International Preliminary Report on Patentability of the International Bureau and Written Opinion in counterpart International Application No. PCT/JP2015/077551, issued on Apr. 11, 2017.
Communication dated Jul. 23, 2018, issued by the European Patent Office in counterpart European Application No. 15848426.1.

* cited by examiner

*Primary Examiner* — Holly Rickman
*Assistant Examiner* — Linda N Chau
(74) *Attorney, Agent, or Firm* — Sughrue Mion, PLLC

(57) ABSTRACT

The present invention aims to provide a resin composition capable of providing a molded article that has high slidability and high impact resistance, as well as excellent tensile strength. The present invention relates to a resin composition containing an aromatic polyether ketone resin (I) and a fluororesin (II). The composition preferably has a sodium content of 120 ppm or less relative to the composition or a calcium content of 15 ppm or less relative to the composition.

10 Claims, No Drawings

RESIN COMPOSITION AND MOULDED ARTICLE

CROSS REFERENCE TO RELATED APPLICATIONS

This application is a National Stage of International Application No. PCT/JP2015/077551 filed Sep. 29, 2015, claiming priority based on Japanese Patent Application No. 2014-209140 filed Oct. 10, 2014, the contents of all of which are incorporated herein by reference in their entirety.

TECHNICAL FIELD

The present invention relates to resin compositions and molded articles.

BACKGROUND ART

For the purpose of weight reduction and cost reduction, substitution of metal parts with resin parts has been actively examined, and automobile parts, industrial parts, or electrical and electronic parts formed from thermoplastic resin, such as polyamide resin, polycarbonate resin, or polyacetal resin, are put into practical use. Also, with regard to applications relating to sliding parts such as gears and bearing retainers, substitution of metal sliding parts with resin sliding parts is in progress. However, sliding parts formed from such thermoplastic resin have insufficient slidability for the use under conditions such as a high load, a high temperature, and a high rotational speed, and are therefore likely to suffer from defects such as abrasion, melting, cracking, and chipping.

On the contrary, fluororesin has excellent characteristics such as slidability, heat resistance, chemical resistance, solvent resistance, weather resistance, flexibility, and electrical properties, and is therefore used in a wide variety of fields such as automobiles, industrial machinery, OA equipment, and electrical and electronic equipment. In particular, fluororesin has excellent slidability, and the friction coefficient thereof is prominently lower than that of any other resin. Still, fluororesin may be inferior to crystallizable heat-resistant thermoplastic resin in physical heat resistance represented by parameters such as mechanical properties and a heat deflection temperature in many cases, and may be inferior to non-crystallizable heat-resistant thermoplastic resin in dimension stability in some cases. Thus, in fact, the range of use is limited.

Then, Patent Literature 1 proposes a resin composition capable of providing a molded article that has both a low coefficient of kinetic friction and a high PV limit. This resin composition contains an aromatic polyether ketone resin (I) and a fluororesin (II), wherein the fluororesin (II) is a copolymer of tetrafluoroethylene and a perfluoroethylenic unsaturated compound represented by the following formula (1):

$$CF_2=CF-Rf^1 \qquad (1)$$

(wherein $Rf^1$ is $-CF_3$ or $-ORf^2$, where $Rf^2$ is a C1-C5 perfluoroalkyl group), the aromatic polyether ketone resin (I) and the fluororesin (II) satisfy a mass ratio (I):(II) of 95:5 to 50:50, the fluororesin (II) is dispersed in the form of particles in the aromatic polyether ketone resin (I), and the fluororesin (II) has an average dispersed particle size of 3.0 μm or smaller.

Patent Literature 2 proposes a resin composition capable of providing a molded article that has excellent flexibility, high acid resistance, and excellent electrical properties. The resin composition contains an aromatic polyether ketone resin (I) and a fluororesin (II), wherein the aromatic polyether ketone resin (I) and the fluororesin (II) satisfy a mass ratio (I):(II) of 50:50 to 10:90.

Patent Literature 3 proposes an incombustible thermoplastic resin composition for forming a thin molded article having a thin portion with a thickness of 1.5 mm or smaller. This resin composition contains a thermoplastic resin (A) containing a repeating unit having an arylene group, an ether group, and a carbonyl group, and a thermoplastic fluororesin (B), wherein the thermoplastic resin (A) and the thermoplastic fluororesin (B) satisfy a weight ratio (former/latter) of 80/20 to 99/1, the thermoplastic fluororesin (B) is dispersed in the form of particles in the thermoplastic resin (A) to form a dispersed phase, and the dispersed phase has an average particle size of 3 μm or smaller.

CITATION LIST

Patent Literature

Patent Literature 1: WO 2012/005133
Patent Literature 2: WO 2014/024671
Patent Literature 3: WO 2014/034493

SUMMARY OF INVENTION

Technical Problem

Conventional techniques disclosed in Patent Literature documents 1 to 3 have been developed for the purpose of improving the characteristics such as slidability and impact resistance of molded articles. However, no examination has been performed focusing on the tensile strength of a molded article to be obtained. The present invention aims to provide a resin composition capable of providing a molded article that has high slidability and high impact resistance, as well as excellent tensile strength.

Solution to Problem

The inventors have performed studies to find, surprisingly, that the sodium content and calcium content in the materials of a molded article have an influence on the tensile strength of a finished product, thereby completing the present invention.

Specifically, the present invention relates to a resin composition containing: an aromatic polyether ketone resin (I); and a fluororesin (II), the composition having a sodium content of 120 ppm or less relative to the composition or a calcium content of 15 ppm or less relative to the composition.

In the resin composition of the present invention, preferably, the sodium content is 120 ppm or less relative to the composition and the calcium content is 15 ppm or less relative to the composition.

The fluororesin (II) is preferably a copolymer of tetrafluoroethylene and a perfluoroethylenic unsaturated compound represented by the following formula (1):

$$CF_2=CF-Rf^1 \qquad (1)$$

wherein $Rf^1$ is $-CF_3$ or $-ORf^2$, where $Rf^2$ is a C1-C5 perfluoroalkyl group.

In the resin composition of the present invention, the aromatic polyether ketone resin (I) and the fluororesin (II) preferably satisfy a mass ratio (I):(II) of 99:1 to 30:70.

In the resin composition of the present invention, the aromatic polyether ketone resin (I) and the fluororesin (II) preferably satisfy a melt viscosity ratio (I)/(II) of 0.01 to 5.0.

The fluororesin (II) preferably has a melting point of 230° C. to 350° C.

The aromatic polyether ketone resin (I) is preferably polyetheretherketone.

The present invention also relates to a pellet which is obtainable by molding the above resin composition. Preferably, a lubricant is added to the pellet after the molding.

The present invention also relates to a molded article which is formed from the above resin composition or the above pellet. The present invention also relates to an electric wire which is covered with the above resin composition or the above pellet.

The present invention also relates to a method for producing the above resin composition, including: selecting combination of an aromatic polyether ketone resin (I) and a fluororesin (II) so as to satisfy a sodium content of 120 ppm or less relative to the composition or a calcium content of 15 ppm or less relative to the composition; and kneading the aromatic polyether ketone resin (I) and the fluororesin (II).

Advantageous Effects of Invention

Since the resin composition of the present invention has the aforementioned configuration, it can provide a molded article that has high slidability and high impact resistance, as well as excellent tensile strength. Since the molded article of the present invention has the aforementioned configuration, it exhibits high slidability and high impact resistance, as well as excellent tensile strength.

DESCRIPTION OF EMBODIMENTS

The present invention will be specifically described hereinbelow.

The inventors performed studies for improving the tensile strength of a molded article obtainable from a resin composition containing an aromatic polyether ketone resin and a fluororesin, and found that reducing the concentration of a specific metal species contained in the composition leads to improvement of the tensile strength of a molded article to be obtained, thereby completing the present invention.

The resin composition of the present invention has a sodium content of 120 ppm or less relative to the composition or a calcium content of 15 ppm or less relative to the composition. The resin composition of the present invention having a sodium or calcium content within the above specific range leads to excellent tensile strength of a molded article obtained from this resin composition.

In the resin composition of the present invention, the calcium content is preferably 15 ppm or less relative to the composition.

Also, in the resin composition of the present invention, the sodium content is preferably 120 ppm or less relative to the composition and the calcium content is 15 ppm or less relative to the composition.

The sodium content is more preferably 100 ppm or less, still more preferably 80 ppm or less, much more preferably 50 ppm or less, particularly preferably 40 ppm or less, more particularly preferably 30 ppm or less, most preferably 20 ppm or less, relative to the composition. The lower limit thereof may be 0 ppm, or may be 0.5 ppm.

The calcium content is more preferably 10 ppm or less, still more preferably 8 ppm or less, much more preferably 6 ppm or less, particularly preferably 5 ppm or less, most preferably 4 ppm or less, relative to the composition. The lower limit thereof may be 0 ppm, or may be 0.5 ppm.

The sodium and calcium contents in the resin composition can be determined by ashing 1 g of a sample at 600° C., dissolving the residue in hydrochloric acid, and analyzing the solution by ICP atomic emission spectroscopy.

The resin composition of the present invention contains an aromatic polyether ketone resin (I) and a fluororesin (II).

The aromatic polyether ketone resin (I) may be any resin containing a repeating unit having an arylene group, an ether group (—O—), and a carbonyl group (—C(=O)—), and may contain a repeating unit represented by any of the following formulas (a1) to (a5):

  (a1)

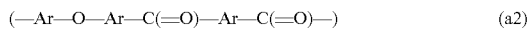  (a2)

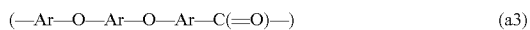  (a3)

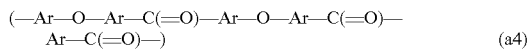  (a4)

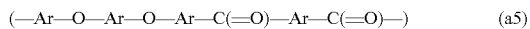  (a5)

wherein Ar is a divalent aromatic hydrocarbon ring group which may optionally have a substituent.

Examples of the divalent aromatic hydrocarbon ring group represented by Ar include: C6-C10 arylene groups such as phenylene groups (e.g., an o-, m-, or p-phenylene group) and a naphthylene group; biarylene groups (the carbon number of each arylene group is 6 to 10) such as biphenylene groups (e.g., a 2,2'-biphenylene group, a 3,3'-biphenylene group, and a 4,4'-biphenylene group); and terarylene groups (the carbon number of each arylene group is 6 to 10) such as an o-, m-, or p-terphenylene group. These aromatic hydrocarbon ring groups may have any substituent selected from, for example, halogen atoms, alkyl groups (e.g., a methyl group and other linear or branched C1-C4 alkyl groups), haloalkyl groups, a hydroxy group, alkoxy groups (e.g., a methoxy group and other linear or branched C1-C4 alkoxy groups), a mercapto group, an alkylthio group, a carboxyl group, a sulfo group, an amino group, a N-substituted amino group, and a cyano group. In the repeating units (a1) to (a5), multiple Ar groups may be the same as or different from each other.

Ar is preferably a phenylene group (e.g., a p-phenylene group) or a biphenylene group (e.g., a 4,4'-biphenylene group).

One example of a resin having a repeating unit (a1) is polyetherketone (e.g., "PEEK-HT" available from Victrex). One example of a resin having a repeating unit (a2) is polyetherketoneketone (e.g., "PEKK" available from Arkema+Oxford Performance Materials). Examples of a resin having a repeating unit (a3) include polyetheretherketone (e.g., "VICTREX PEEK" available from Victrex; "Vestakeep®" available from Evonik; "Vestakeep-J" available from Daicel-Evonik; "KetaSpire®" available from Solvay Specialty Polymers) and polyether-diphenyl-ether-phenyl-ketone-phenyl (e.g., "Kadel®" available from Solvay Specialty Polymers). One example of a resin having a repeating unit (a4) is polyetherketoneetherketoneketone (e.g., "VICTREX ST" available from Victrex). One example of a resin having a repeating unit (a5) is polyetheretherketoneketone.

A repeating unit having an arylene group, an ether group, and a carbonyl group satisfies, for example, a ratio (E/K) of an ether segment (E) to a ketone segment (K) of 0.5 to 3, preferably about 1 to 2.5. The ether segment gives flexibility to the molecule chain and the ketone segment gives stiffness to the molecule chain. Thus, the larger the amount of the ether segment is, the higher the crystallizing speed and the final crystallinity tend to be, while the larger the amount of the ketone segment is, the higher the glass transition temperature and the melting point tend to be.

These aromatic polyether ketone resins (I) may be used alone or in combination of two or more.

Preferred among these aromatic polyether ketone resins (I) are aromatic polyether ketone resins having any of the repeating units (a1) to (a4). For example, the aromatic polyether ketone resin (I) is preferably at least one resin selected from the group consisting of polyetherketone, polyetheretherketone, polyetherketoneketone, and polyetherketoneetherketoneketone. The aromatic polyether ketone resin (I) is more preferably at least one resin selected from the group consisting of polyetherketone and polyetheretherketone.

In particular, for excellent balance of a high glass transition temperature, a high melting point, and a high crystallizing speed, an aromatic polyether ketone resin having a repeating unit (a3) is preferred, and polyetheretherketone is still more preferred.

The aromatic polyether ketone resin (I) preferably has a melt viscosity of 0.01 to 4.0 kNsm$^{-2}$ at 60 sec$^{-1}$ and 390° C. A melt viscosity within this range may lead to improvement of the processability and production of a molded article having excellent tensile strength. The lower limit of the melt viscosity is more preferably 0.05 kNsm$^{-2}$, still more preferably 0.08 kNsm$^{-2}$, much more preferably 0.10 kNsm$^{-2}$, particularly preferably 0.15 kNsm$^{-2}$, most preferably 0.25 kNsm$^{-2}$. The upper limit of the melt viscosity is more preferably 3.5 kNsm$^{-2}$, still more preferably 3.0 kNsm$^{-2}$, much more preferably 2.8 kNsm$^{-2}$, particularly preferably 2.5 kNsm$^{-2}$, most preferably 2.3 kNsm$^{-2}$.

The melt viscosity of the aromatic polyether ketone resin (I) is determined in conformity with ASTM D3835.

The aromatic polyether ketone resin (I) preferably has a glass transition temperature of 130° C. or higher. The glass transition temperature is more preferably 135° C. or higher, still more preferably 140° C. or higher. A glass transition temperature within this range may lead to production of a resin composition having excellent heat resistance. The glass transition temperature is determined using a differential scanning calorimetry (DSC) device.

The aromatic polyether ketone resin (I) preferably has a melting point of 300° C. or higher. The melting point is more preferably 320° C. or higher. A melting point within this range may lead to improvement of the heat resistance of a molded article to be obtained. The melting point is determined using a differential scanning calorimetry (DSC) device.

The sodium content in the aromatic polyether ketone resin (I) is preferably 300 ppm or less, more preferably 200 ppm or less, still more preferably 150 ppm or less, much more preferably 100 ppm or less, particularly preferably 50 ppm or less, relative to the resin (I).

The calcium content in the aromatic polyether ketone resin (I) is preferably 30 ppm or less, more preferably 25 ppm or less, still more preferably 20 ppm or less, much more preferably 15 ppm or less, particularly preferably 10 ppm or less, most preferably 5 ppm or less, relative to the resin (I).

The sodium and calcium contents in the aromatic polyether ketone resin (I) respectively mean the amounts of sodium and calcium in the resin (I) which serves as a material for producing the resin composition of the present invention.

The fluororesin (II) is, for example, a polymer having a polymerized unit based on at least one fluorine-containing ethylenic monomer. The fluororesin (II) is preferably a melt-fabricable fluororesin. One fluororesin (II) may be used, or two or more fluororesins (II) may be used.

Examples of the fluororesin (II) include tetrafluoroethylene (TFE)/hexafluoropropylene (HFP) copolymers, TFE/HFP/perfluoro(alkyl vinyl ether) (PAVE) copolymers, TFE/PAVE copolymers (PFA), ethylene (Et)/TFE copolymers, Et/TFE/HFP copolymers, polychlorotrifluoroethylene (PCTFE), chlorotrifluoroethylene (CTFE)/TFE copolymers, CTFE/TFE/PAVE copolymers, Et/CTFE copolymers, TFE/vinylidene fluoride (VdF) copolymers, VdF/HFP/TFE copolymers, VdF/HFP copolymers, polyvinylidene fluoride (PVdF), and polyvinyl fluoride (PVF). As long as it is melt-fabricable, polytetrafluoroethylene (PTFE) with a low molecular weight may also be used.

PAVE is preferably one having a C1-C6 alkyl group, and examples thereof include perfluoro(methyl vinyl ether), perfluoro(ethyl vinyl ether), perfluoro(propyl vinyl ether), and perfluoro(butyl vinyl ether).

The fluororesin (II) is more preferably a copolymer of tetrafluoroethylene (TFE) and a perfluoroethylenic unsaturated compound represented by the following formula (1):

$$CF_2=CF-Rf^1 \qquad (1)$$

wherein Rf$^1$ is —CF$_3$ or —ORf$^2$, where Rf$^2$ is a C1-C5 perfluoroalkyl group. When Rf$^1$ is —ORf$^2$, Rf$^2$ is preferably a C1-C3 perfluoroalkyl group. Use of the above fluororesin (II) may lead to production of a molded article having excellent tensile strength.

In order to provide a molded article having better characteristics such as impact resistance, molding stability, and withstand voltage performance, the perfluoroethylenic unsaturated compound represented by the formula (1) is preferably at least one selected from the group consisting of hexafluoropropylene (HFP), perfluoro(methyl vinyl ether) (PMVE), perfluoro(ethyl vinyl ether) (PEVE), and perfluoro(propyl vinyl ether) (PPVE), more preferably at least one selected from the group consisting of hexafluoropropylene and perfluoro(propyl vinyl ether).

The fluororesin (II) is still more preferably a copolymer of TFE and HFP or a copolymer of TFE, HFP, and PPVE.

The fluororesin (II) preferably contains 60 to 99 mass % of TFE and 1 to 40 mass % of a perfluoroethylenic unsaturated compound represented by the formula (1). The lower limit of the amount of TFE constituting the fluororesin (II) is more preferably 68 mass %, still more preferably 72 mass %, particularly preferably 77 mass %, more particularly preferably 83 mass %. The upper limit of the amount of TFE constituting the fluororesin (II) is more preferably 98 mass %, still more preferably 97 mass %.

The lower limit of the amount of the perfluoroethylenic unsaturated compound represented by the formula (1) constituting the fluororesin (II) is more preferably 2 mass %, still more preferably 3 mass %. The upper limit of the amount of the perfluoroethylenic unsaturated compound represented by the formula (1) constituting the fluororesin (II) is more preferably 32 mass %, still more preferably 28 mass %, particularly preferably 23 mass %, more particularly preferably 17 massa.

The fluororesin (II) is preferably a copolymer consisting only of TFE and a perfluoroethylenic compound represented by the formula (1).

The fluororesin (II) preferably has a melt viscosity of 0.2 to 4.0 kNsm$^{-2}$ at 60 sec$^{-1}$ and 390° C. A melt viscosity within this range may lead to improvement of the processability and production of a molded article having better characteristics such as impact resistance, molding stability, and withstand voltage performance. The lower limit of the melt viscosity is more preferably 0.25 kNsm$^{-2}$, still more preferably 0.3 kNsm$^{-2}$, particularly preferably 0.35 kNsm$^{-2}$, most preferably 0.4 kNsm$^{-2}$. The upper limit of the melt viscosity is more preferably 3.7 kNsm$^{-2}$, still more preferably 3.6 kNsm$^{-2}$, particularly preferably 3.5 kNsm$^{-2}$.

The melt viscosity of the fluororesin (II) is determined in conformity with ASTM D3835.

The fluororesin (II) preferably has a melt flow rate (MFR) of 0.1 to 100 g/10 min, more preferably 0.5 to 80 g/10 min, still more preferably 0.5 to 70 g/10 min, at a temperature of 372° C. and a load of 5000 g. A MFR within this range may lead to production of a molded article having better tensile strength. The lower limit of the MFR is still more preferably 0.7 g/10 min, particularly preferably 1.0 g/10 min, more particularly preferably 1.5 g/10 min, most preferably 2.0 g/10 min. The upper limit of the MFR is still more preferably 60 g/10 min, particularly preferably 50 g/10 min, more particularly preferably 45 g/10 min, most preferably 40 g/10 min.

The MFR of the fluororesin (II) is determined using a melt indexer in conformity with ASTM D1238. The parameters such as the measurement temperature and the load are set with reference to the respective standards for fluororesin (e.g., ASTM D2116).

The melting point of the fluororesin (II) may be any value, and is preferably equal to or lower than the melting point of the aromatic polyetherketone resin (I) because the fluororesin (II) is preferably already in a molten state at a temperature where the aromatic polyether ketone resin (I) used in molding is molten. For example, the melting point of the fluororesin (II) is preferably 230° C. to 350° C., more preferably 240° C. to 310° C., still more preferably 240° C. to 300° C. The melting point of the fluororesin (II) is determined as the temperature corresponding to the maximum value on the heat-of-fusion curve at a temperature-increasing rate of 10° C./min using a differential scanning calorimetry (DSC) device.

The sodium content in the fluororesin (II) is preferably 10 ppm or less, more preferably 3 ppm or less, relative to the resin (II).

The calcium content in the fluororesin (II) is preferably 10 ppm or less, more preferably 3 ppm or less, relative to the resin (II).

The sodium and calcium contents in the fluororesin (II) respectively mean the amounts of sodium and calcium in the resin (II) which serves as a material for producing the resin composition of the present invention.

The fluororesin (II) may be treated with fluorine gas or ammonia by a known method in advance.

Since the resin composition of the present invention contains the aromatic polyether ketone resin (I) and the fluororesin (II), this resin composition provides a molded article having excellent characteristics such as slidability and impact resistance.

In the resin composition of the present invention, the aromatic polyether ketone resin (I) and the fluororesin (II) preferably satisfy a melt viscosity ratio (I)/(II) (aromatic polyether ketone resin (I)/fluororesin (II)) of 0.01 to 5.0. A melt viscosity ratio (I)/(II) within this range may lead to production of a molded article having better characteristics such as impact resistance, molding stability, and withstand voltage performance. The lower limit of the melt viscosity ratio (I)/(II) is more preferably 0.02, still more preferably 0.025, particularly preferably 0.03. The upper limit of the melt viscosity ratio (I)/(II) is more preferably 4.0, still more preferably 3.0, particularly preferably 2.5, more particularly preferably 2.0, most preferably 1.8.

In the resin composition of the present invention, the aromatic polyether ketone resin (I) and the fluororesin (II) may have any mass ratio (I):(II). For example, the mass ratio is preferably 99:1 to 30:70. The mass ratio is more preferably 95:5 to 35:65, still more preferably 95:5 to 40:60.

In the resin composition of the present invention, the fluororesin (II) is dispersed in the form of particles in the aromatic polyether ketone resin (I), and preferably has an average dispersed particle size of smaller than 3.0 μm. An average dispersed particle size of smaller than 3.0 μm may lead to production of a molded article having better characteristics such as impact resistance, molding stability, and withstand voltage performance.

In order to provide a molded article having better characteristics and to improve the moldability, the average dispersed particle size of the fluororesin (II) is more preferably 2.0 μm or smaller, still more preferably 1.5 μm or smaller, much more preferably 1.0 μm or smaller, particularly preferably 0.7 μm or smaller, more particularly preferably 0.5 μm or smaller, most preferably 0.3 μm or smaller. The lower limit of the average dispersed particle size may be any value, and may be 0.01 μm.

The resin composition of the present invention preferably has a maximum dispersed particle size of 10 μm or smaller. A maximum dispersed particle size of 10 μm or smaller may lead to improvement of the mechanical strength and abrasion resistance. In order to improve the moldability, as well as the mechanical strength and the abrasion resistance, the maximum dispersed particle size of the fluororesin (II) is more preferably 5 μm or smaller, still more preferably 1 μm or smaller, particularly preferably 0.8 μm or smaller, more particularly preferably 0.7 μm or smaller, most preferably 0.5 μm or smaller.

In the resin composition of the present invention, preferably, the average dispersed particle size of the fluororesin (II) is smaller than 0.3 μm and the maximum dispersed particle size is 0.8 μm or smaller. An average dispersed particle size of smaller than 0.3 μm and a maximum dispersed particle size of 0.8 μm or smaller may lead to production of a molded article having better characteristics such as impact resistance, molding stability, and withstand voltage performance.

The maximum dispersed particle size of the fluororesin (II) is more preferably 0.7 μm or smaller, still more preferably 0.5 μm or smaller.

In the resin composition of the present invention, preferably, the melting point of the fluororesin (II) is 230° C. to 350° C. and the mass ratio (I):(II) of the aromatic polyether ketone resin (I) to the fluororesin (II) is 99:1 to 30:70. A melting point of the fluororesin (II) of 230° C. to 350° C. and a mass ratio (I):(II) of 99:1 to 30:70 may lead to production of a molded article having better characteristics such as impact resistance, molding stability, and withstand voltage performance.

In the resin composition of the present invention, more preferably, the melting point of the fluororesin (II) is 240° C. to 310° C. and the mass ratio (I):(II) is 95:5 to 35:65; still more preferably, the melting point of the fluororesin (II) is 240° C. to 300° C. and the mass ratio (I):(II) is 95:5 to 40:60.

In the resin composition of the present invention, preferably, the melt viscosity ratio (I)/(II) (aromatic polyether ketone resin (I)/fluororesin (II)) of the aromatic polyether ketone resin (I) to the fluororesin (II) is 0.01 to 5.0 and the mass ratio (I):(II) of the aromatic polyether ketone resin (I)

to the fluororesin (II) is 99:1 to 30:70. A melt viscosity ratio (I)/(II) of 0.01 to 5.0 and a mass ratio (I):(II) of 99:1 to 30:70 may lead to production of a molded article having better characteristics such as impact resistance, molding stability, and withstand voltage performance. In the resin composition of the present invention, more preferably, the melt viscosity ratio (I)/(II) is 0.02 to 4.0 and the mass ratio (I):(II) is 95:5 to 35:65; still more preferably, the melt viscosity ratio (I)/(II) is 0.025 to 3.0 and the mass ratio (I):(II) is 99:1 to 30:70.

In the resin composition, preferably, the average dispersed particle size of the fluororesin (II) is smaller than 3.0 µm and the mass ratio (I):(II) of the aromatic polyether ketone resin (I) to the fluororesin (II) is 99:1 to 30:70. An average dispersed particle size of the fluororesin (II) of smaller than 3.0 µm and a mass ratio (I):(II) of 99:1 to 30:70 may lead to production of a molded article having better characteristics such as impact resistance, molding stability, and withstand voltage performance.

In the resin composition, more preferably, the average dispersed particle size of the fluororesin (II) is 2.0 µm or smaller and the mass ratio (I):(II) is 95:5 to 35:65; still more preferably, the average dispersed particle size of the fluororesin (II) is 1.5 µm or smaller and the mass ratio (I):(II) is 95:5 to 40:60.

The average dispersed particle size and maximum dispersed particle size of the fluororesin (II) can be determined by preparing a strand of the resin composition obtained by melt-kneading, cutting out a slice having a thickness of 20 to 60 µm from the strand by a known method, microscopically observing the resulting slice to provide a microscopic image data, and binarizing the microscopic image data. The method of cutting out a slice may be microtome, for example. The microscope may be a confocal laser scanning microscope or a transmission electron microscope (TEM), for example.

The resin composition of the present invention contains the aromatic polyether ketone resin (I) and the fluororesin (II), and may further contain other optional components. Any components may be used, and examples thereof include fibrous reinforcing materials such as whiskers (e.g. potassium titanate whiskers), glass fibers, asbestos fibers, carbon fibers, ceramic fibers, potassium titanate fibers, aramid fibers, and other high-strength fibers; inorganic fillers such as talc, mica, clay, carbon powder, graphite, and glass beads; colorants; usually used inorganic or organic fillers such as flame retardants; lubricants such as silicone oil and molybdenum disulfide; pigments; conducting agents such as carbon black; impact resistance improvers such as rubber; lubricants such as magnesium stearate; ultraviolet absorbers such as benzotriazole compounds; foaming agents such as boron nitride; and other additives.

These additives in amounts that do not impair the effects of the present invention may be added to the aromatic polyether ketone resin (I) which serves as a material, or to the fluororesin (II) which serves as a material. Also, these additives in amounts that do not impair the effects of the present invention may be added to the materials in a molten state by, for example, side feeding upon kneading of the aromatic polyether ketone resin (I) and the fluororesin (II).

The resin composition of the present invention may be in any form, and may be in the form of pellets. In other words, a pellet obtainable by molding the resin composition of the present invention is also one aspect of the present invention.

The pellet of the present invention may be obtainable by kneading the aromatic polyether ketone resin (I) and the fluororesin (II) using a kneader, taking out the kneading product from the kneader, and then molding the product into pellets, or may be obtainable by kneading the aromatic polyether ketone resin (I) and the fluororesin (II) using a kneader, and then extrusion-molding (e.g., melt-extruding) the kneading product from the kneader.

The molding may be performed by any method, and may be performed by melt extrusion using a twin-screw extruder.

To the pellet may be added a known component which may be post-added after the composition is molded into the pellet. This addition to the pellet may be achieved by a known method, and examples thereof include spray-addition to the pellet and dry blending of the pellet and powder of an additive. For example, a lubricant (e.g., magnesium stearate) may be added to the pellet after the molding. A molded article formed from the pellet has excellent tensile strength.

The pellet may be further kneaded after a known component which may be post-added is added thereto.

With regard to the method of producing a resin composition including kneading an aromatic polyether ketone resin (I) and a fluororesin (II), the inventors found that selecting combination of the aromatic polyether ketone resin (I) and the fluororesin (II) so as to satisfy a sodium content of 120 ppm or less or a calcium content of 15 ppm or less in total enables uniform dispersion of the fluororesin (II) in the aromatic polyether ketone resin (I) even under milder kneading conditions.

Although the cause is not obvious, kneading under conditions with a low sodium content or a low calcium content, i.e., selecting combination of the aromatic polyether ketone resin (I) and the fluororesin (II) so as to satisfy a sodium content of 120 ppm or less or a calcium content of 15 ppm or less in the production method including kneading the aromatic polyether ketone resin (I) and the fluororesin (II) leads to favorable kneadability, enabling production of a resin composition in which the fluororesin (II) is uniformly dispersed in the aromatic polyether ketone resin (I) even without an excessive load on the respective resins. This also enables uniform kneading even under mild kneading conditions, and thus the resins can be kneaded without an excessive load on the respective resins in the kneading, enabling production of a resin composition having high slidability and impact resistance, as well as excellent tensile strength.

In other words, a method of producing a resin composition including selecting combination of an aromatic polyether ketone resin (I) and a fluororesin (II) so as to satisfy a sodium content of 120 ppm or less or a calcium content of 15 ppm or less and kneading the aromatic polyether ketone resin (I) and the fluororesin (II) is also one aspect of the present invention. The resin composition of the present invention can be favorably produced by the above production method.

A pellet obtainable by molding the resin composition which is obtained by the above production method and such a pellet with a lubricant being added thereto after the molding are also aspects of the present invention.

Selecting an appropriate combination can be performed by the following method which would be easily implemented by a person skilled in the art.

First, the sodium and calcium contents in the aromatic polyether ketone resin (I) and the fluororesin (II) are determined by the same method as for the resin composition, whereby the amounts of sodium and calcium are determined. The sodium and calcium contents in the aromatic polyether ketone resin (I) and the fluororesin (II) may be adjusted by a method of kneading the aromatic polyether ketone resin (I) or the fluororesin (II) with a known additive containing metal in a molten state, a method of washing the aromatic polyether ketone resin (I) and the fluororesin (II) with water or an organic solvent, or a method of kneading the aromatic polyether ketone resin (I) and the fluororesin (II) with the aromatic polyether ketone resin (I) and the fluororesin (II) with a lower metal content in a molten state to dilute the resins.

Next, the mass ratio between the aromatic polyether ketone resin (I) and the fluororesin (II) is determined.

Then, based on the amounts of sodium and calcium in the respective resins and the mass ratio of the resins, the amounts of sodium and calcium in a composition to be obtained in the end can be calculated.

The kneading of the aromatic polyether ketone resin (I) and the fluororesin (II) can be performed using a mixer such as a mixing mill, a Banbury mixer, a pressure kneader, or an extruder. In order to achieve a small average dispersed particle size of the fluororesin (II), the mixer is preferably a twin-screw extruder, particularly preferably a twin-screw extruder having a large L/D screw structure. The screw structure of a twin-screw extruder more preferably satisfies L/D=35 or higher, more preferably L/D=40 or higher, still more preferably L/D=45 or higher. L/D means the ratio of effective screw length (L)/screw diameter (D).

The resin composition of the present invention may be produced by kneading the aromatic polyether ketone resin (I) and the fluororesin (II) in a molten state. Kneading of the aromatic polyether ketone resin (I) and the fluororesin (II) in a molten state provides a resin composition having a desired dispersion state. The dispersion state of the fluororesin (II) affects the impact resistance, molding stability, withstand voltage performance, and other characteristics of a molded article to be obtained. Thus, in order to achieve a desired dispersion state in the molded article, the mixing method needs to be appropriately selected.

The kneading temperature may be appropriately set in accordance with, for example, the types of the aromatic polyether ketone resin (I) and the fluororesin (II) to be used. For example, the temperature is preferably 360° C. to 430° C. The kneading time is usually 10 seconds to 1 hour.

As mentioned above, the resin composition of the present invention can achieve a favorable dispersion state even by kneading under mild kneading conditions, and can avoid an excessive load on the respective resins. The mild kneading conditions may include a kneader temperature of 360° C. to 380° C. The molding conditions may also be defined by the resin temperature immediately after the kneading. The resin temperature immediately after the kneading is preferably 425° C. or lower, more preferably 420° C. or lower, still more preferably 415° C. or lower.

The optional components may be added to and mixed with the aromatic polyether ketone resin (I) and the fluororesin (II) in advance, or may be added to the aromatic polyether ketone resin (I) and the fluororesin (II) when these resins are blended.

A molded article formed from the resin composition or pellet of the present invention is also one aspect of the present invention.

In the electrical and electronic field and the semiconductor field, the molded article formed from the resin composition of the present invention may be used for components of semiconductor- or liquid crystal device-manufacturing devices (e.g. CMP retainer rings, etching rings, silicon wafer carriers, and IC chip trays), insulating films, small button cells, cable connectors, and casings of aluminum electrolytic capacitors. In the automobile field, the molded article may be used for thrust washers, oil filters, gears for automatic air-conditioner controlling units, gears for throttle bodies, coatings for electric wires of motor coils, ABS parts, AT seal rings, MT shift fork pads, bearings, seals, and clutch rings. In the industrial field, the molded article may be used for compressor components, cables for mass transport systems, conveyor belt chains, connectors for oil field development machinery, pump components for hydraulic pressure driver systems (e.g. bearings, port plates, ball joints of pistons), gears, and seal rings for pistons. In the aerospace field, the molded article may be used for cabin interior components and fuel pipe protecting materials in aircraft. The molded article may also be used for other products such as food and beverage production equipment components, and medical instruments (e.g. sterile instruments, gas and liquid chromatographs).

The molded article may have any of various shapes, such as a sheet shape, a film shape, a rod shape, or a pipe shape.

It is also favorable to produce a molded article for sliding parts from the resin composition of the present invention. A molded article for sliding parts which is formed from the resin composition of the present invention has not only excellent tensile strength but also a low coefficient of kinetic friction, and thus is suitably used as a sliding part. Since the molded article contains the fluororesin (II), the molded article also has excellent characteristics such as chemical resistance, weather resistance, non-adhesiveness, water repellence, and electrical properties.

Examples of the molded article for sliding parts include, but are not particularly limited to, sealants, gears, actuators, pistons, bearings, bearing retainers, bushings, switches, belts, bearings, cams, rollers, and sockets.

Bearings are elements placed around a shaft and used in contact with the shaft. Examples thereof include shaft washers of antifriction bearings and plain bearings. They usually support a rotationally or linearly moving shaft and keep the motion and the working load. These bearings may be used alone, or may be used in combination with other elements. When used in combination with other elements, examples thereof include antifriction bearings such as ball bearings, roller bearings, radial bearings, and thrust bearings; plain bearings such as circular bearings, partial bearings, and non-circular bearings; self-lubricating bearings; foil bearings; and magnetic bearings.

Gears are elements usually attached to a rotationally moving shaft and used for power transmission. Examples thereof include spur gears, helical gears, racks, internal gears, bevel gears, miter gears, screw gears, worm gears, driving gears, and idle gears.

Seal rings are elements usually attached to a rotationally moving shaft or a shaft moving in the axial direction. Examples thereof include those functioning to seal oil between a transmission or a cylinder of a piston and the shaft. Such seal rings can be used for various applications, such as seal rings for automatic transmissions of automobiles and pistons for engines of automobiles, ships, construction vehicles, and industrial machinery.

Any conditions may be applicable to a molding device used in the method of producing a molded article, and usual conditions can be used, for example. The molding temperature is usually preferred to be equal to or higher than the melting point of the aromatic polyether ketone resin (I) used. Also, the molding temperature is preferably below the lower of the decomposition temperature of the fluororesin (II) and the decomposition temperature of the aromatic polyether ketone resin (I). Such a molding temperature may be, for example, 250° C. to 400° C.

The molded article of the present invention may be formed by a molding method commonly used for thermoplastic resin compositions, such as injection molding, extrusion molding, press molding, blow molding, calender molding, and casting, in accordance with the type, use, and shape of the target molded article. The molded article may also be produced by a molding method which is any combination of the above molding methods. The molded article may also be produced through composite molding of the resin composition of the present invention and a different polymer.

The molded article formed from the resin composition or pellet of the present invention particularly has excellent tensile strength, flexibility, and electrical properties. Thus, when it is used for an insulation layer of an insulated wire, the insulation layer has excellent insulation as well as a low relative dielectric constant. Further, the resulting electric wire has excellent handleability. In addition, such an insulation layer also has excellent heat resistance, mechanical strength, tensile elongation, and crack resistance. Even when the insulated wire is used at high temperature, the insulation layer is not peeled off the conductor. Accordingly, the molded article formed from the resin composition or pellet of the present invention can be suitably used as an insulation layer of an insulated wire.

Thus, an insulated wire including a conductor (A) and an insulation layer (B) that is formed around the conductor (A) and is formed from the resin composition of the present invention exhibits favorable characteristics. The resin composition or pellet of the present invention can also be suitably used for a thin line with a thin insulation layer (B).

In the insulated wire, the insulation layer (B) formed around the conductor (A) may be in contact with the conductor (A), or another layer such as a layer of a different resin may be formed between the insulation layer (B) and the conductor (A). The insulation layer (B) is preferably in contact with the conductor (A). In this case, the conductor (A) and the insulation layer (B) are firmly bonded to each other.

The insulation layer (B) may have any thickness, and the thickness is preferably 1 to 500 µm. The thickness is more preferably 50 to 200 µm, still more preferably 70 to 150 µm. The insulation layer (B) may be made as thin as 80 µm or smaller. Thinning of the insulation layer (B) is advantageous to achieve excellent heat radiation.

The insulation layer (B) may be obtainable by forming the resin composition or pellet of the present invention around the conductor (A). For example, the insulated wire may be produced by a production method including: producing the resin composition of the present invention; and melt-extruding the resin composition or pellet of the present invention into the insulation layer (B) around the conductor (A). The resin composition of the present invention causes no melt fracture even when extrusion-molded at a high shear rate. Thus, the method of molding the resin composition of the present invention shows very high productivity.

The insulation layer (B) may be formed by processing the resin composition of the present invention into a film shape in advance and then winding the film-shaped resin composition around the conductor (A).

Use of the resin composition or pellet of the present invention leads to a bond strength between the insulation layer (B) and the conductor (A) of 10 N/cm or higher. A bond strength within this range is particularly suitable for uses such as electric wires for automobiles and windings for motor coils. The bond strength is more preferably 15 N/cm or higher, still more preferably 20 N/cm or higher. The bond strength is determined in conformity with ISO 6722.

The insulation layer (B) may be formed by any method, and conventionally known conditions may be applied. The insulation layer (B) may be formed directly on the conductor (A), or may be formed with an optional layer such as an optional resin layer being disposed in between.

The insulation layer (B) may be formed by, for example, a method in which the resin composition or pellet is melt-extruded onto the surface of the conductor (A) or the surface of an optional resin layer which is formed on the conductor (A) in advance, or a method in which the resin composition is melt-extruded to form a film in advance, the film is slit into a predetermined size, and the resulting film is wound around the surface of the conductor (A) or the surface of an optional resin layer which is formed on the conductor (A) in advance.

In the case of forming the insulation layer (B) by melt-extrusion, the temperature for formation is usually preferred to be equal to or higher than the melting point of the aromatic polyether ketone resin (I) used. The molding temperature is preferably below the lower of the decomposition temperature of the fluororesin (II) and the decomposition temperature of the aromatic polyether ketone resin (I). The molding temperature may be, for example, 250° C. to 420° C. The molding temperature is preferably 300° C. to 400° C.

The insulated wire may be heated after the insulation layer (B) is formed. The heating may be performed at a temperature around the melting point of the fluororesin (II).

The insulated wire includes the insulation layer (B) formed around the conductor (A). An optional layer such as an optional resin layer may be disposed between the conductor (A) and the insulation layer (B). Further, the insulated wire may have another optional layer such as another optional resin layer around the insulation layer (B).

The optional resin layers are different from the insulation layer (B). The optional resin layers are each preferably a layer of at least one resin selected from the group consisting of aromatic polyether ketone resin, fluororesin, polyamide imide, polyether imide, polyether sulfone, and polyphenylene sulfide.

The material of the conductor (A) may be any favorably conductive material, and examples thereof include copper, tin-plated copper, silver-plated copper, copper alloy, copper-clad aluminum, aluminum, silver, gold, and zinc-plated iron.

The conductor (A) may have any shape such as a circular shape or a planar shape.

The insulated wire may be suitably used as a wrapped electric wire, an electric wire for automobiles, an electric wire for robots, or the like. It may also be suitably used as a winding (magnet wire) for coils, and the insulated wire is less likely to cause damages in winding processes. The winding is suitable for motors, rotary electric machinery, compressors, voltage converters (transformers), and the like, and has characteristics sufficiently tolerant to uses in small, high-power motors which require high voltage, high current, and high heat conductivity, as well as a high-density winding process. The winding is also suitable as an electric wire for power distribution, power transmission, or communication.

EXAMPLES

The present invention will be described hereinbelow referring to, but not limited to, the following examples.

<Melting Point of Fluororesin>

The melting point of the fluororesin was determined as the temperature corresponding to the maximum value on the heat-of-fusion curve at a temperature-increasing rate of 10° C./min using a differential scanning calorimetry (DSC) device.

<Measurement of Melt Viscosity>

The melt viscosity of the aromatic polyether ketone resin was determined at 60 sec$^{-1}$ and 390° C. in conformity with ASTM D3835.

The melt viscosity of the fluororesin was determined at 60 sec$^{-1}$ and 390° C. in conformity with ASTM D3835.

The melt viscosity of the resin composition was determined at 60 sec$^{-1}$ and 390° C. in conformity with ASTM D3835.

<Calculation of Average Dispersed Particle Size>

A slice having a thickness of about 30 μm was cut out of a strand of the resin composition obtained by melt-kneading. The cross section of the resulting slice was observed using a confocal laser microscope. The resulting image data was converted into an FRN file using conversion software (Tresvalle 7). This FRN file was read and the resulting electronic image was binarized using image analysis software (WinROOF v6.4, Mitani Corp.). With reference to the brightness histogram of the binarized image, the point where a gap is observed among the frequency values is defined as the threshold value. Using this threshold value, the average dispersed particle size of the dispersed phase was determined by automatic processing.

<Measurement of Metal Contents>

The metal contents in the materials used and the resin compositions produced in the examples and comparative examples were determined by ashing 1 g of a sample at 600° C., dissolving the residue in hydrochloric acid, and analyzing the solution by ICP atomic emission spectroscopy.

<Production of Press-Molded Sheet>

Each of the resin compositions produced in the examples and comparative examples was compression-molded using a heat press at 400° C. and 3 MPa to provide a sheet.

<Measurement of Tensile Strength>

A type V dumbbell (ASTM D638) was produced from the 0.5-mm-thick press sheet produced by the above method. The dumbbell produced was subjected to a tensile test based on ASTM D638, whereby the tensile strength at break and the tensile elongation at break were determined.

<Measurement of PV Limit>

A specimen having a size of 3 cm in length×3 cm in width×3 mm in thickness was cut out of the 3-mm-thick press sheet produced by the above method, and was rubbed with steel S45C (finished with sandpaper #240) using a friction tester at a constant rate of 3 m/sec and a load-increasing rate of 20 N/10 min from 20 N in conformity with the method A in JIS K7218. Thereby, the PV limit was determined.

<Measurement of Coefficient of Kinetic Friction>

Using the 3-mm-thick press sheet produced by the above method, the coefficient of kinetic friction was determined using a ball-on-disc SRV abrasion tester at room temperature and 50 Hz.

In the examples and comparative examples, the following materials were used.

Aromatic polyether ketone resin (1-1): polyetheretherketone (melt viscosity: 0.70 kNsm$^{-2}$, sodium: 20 ppm, calcium: 9.1 ppm)

Aromatic polyether ketone resin (1-2): polyetheretherketone (melt viscosity: 0.70 kNsm$^{-2}$, sodium: 260 ppm, calcium: 2.3 ppm)

Aromatic polyether ketone resin (1-3): polyetheretherketone (melt viscosity: 0.70 kNsm$^{-2}$, sodium: 42 ppm, calcium: 17 ppm)

Aromatic polyether ketone resin (1-4): polyetheretherketone (melt viscosity: 0.70 kNsm$^{-2}$, sodium: 330 ppm, calcium: 30 ppm)

Aromatic polyether ketone resin (2-1): polyetheretherketone (melt viscosity: 0.50 kNsm$^{-2}$, sodium: 28 ppm, calcium: 1.8 ppm)

Aromatic polyether ketone resin (2-2): polyetheretherketone (melt viscosity: 0.50 kNsm$^{-2}$, sodium: 310 ppm, calcium: 28 ppm)

Aromatic polyether ketone resin (2-3): polyetheretherketone (melt viscosity: 0.50 kNsm$^{-2}$, sodium: 370 ppm, calcium: 50 ppm)

The aromatic polyether ketone resins (1-1) to (1-4) are the same resins except for the sodium content and the calcium content.

The aromatic polyether ketone resins (2-1) to (2-3) are the same resins except for the sodium content and the calcium content.

Fluororesin (1-1): tetrafluoroethylene/hexafluoropropylene/perfluoro(propyl vinyl ether) copolymer, melt viscosity: 0.55 kNsm$^{-2}$, melting point: 255° C., sodium: 1.1 ppm, calcium: 0.2 ppm Fluororesin (1-2): tetrafluoroethylene/hexafluoropropylene/perfluoro(propyl vinyl ether) copolymer, melt viscosity: 0.55 kNsm$^{-2}$, melting point: 255° C., sodium: 150 ppm, calcium: 35 ppm Fluororesin (2): tetrafluoroethylene/hexafluoropropylene/perfluoro(propyl vinyl ether) copolymer, melt viscosity: 1.0 kNsm$^{-2}$, melting point: 255° C., sodium: 1.3 ppm, calcium: 0.4 ppm Example 1

The aromatic polyether ketone resin (1-1) and the fluororesin (1-1) were pre-mixed at the ratio (parts by mass) shown in Table 1 and melt-kneaded using a twin-screw extruder (ϕ15 mm, L/D=60) at a cylinder temperature of 375° C., whereby a resin composition was produced. The resin composition was observed using a confocal laser microscope, which confirmed that the fluororesin was dispersed in the form of particles in the aromatic polyether ketone resin. A specimen (press sheet) was produced from the resulting resin composition by the above method, and then the tensile test was performed and the PV limit and the coefficient of kinetic friction were determined. Table 1 shows the results.

Examples 2 to 10 and Comparative Examples 1 to 8

The resin compositions were produced in the same manner as in Example 1 except that the type of the aromatic polyether ketone resin, the type of the fluororesin, and the kneading temperature were changed as shown in Tables 1 to 4. Also, the physical properties were determined in the same manner. Tables 1 to 4 show the results.

TABLE 1

|  |  | Example 1 | Example 2 | Example 3 | Comparative Example 1 | Comparative Example 2 |
|---|---|---|---|---|---|---|
| Polyether ketone resin (1-1) | Parts by mass | 80 |  |  |  |  |
| Polyether ketone resin (1-2) | Parts by mass |  | 80 |  |  |  |
| Polyether ketone resin (1-3) | Parts by mass |  |  | 80 |  |  |
| Polyether ketone resin (1-4) | Parts by mass |  |  |  | 80 | 80 |
| Polyether ketone resin (2-1) | Parts by mass |  |  |  |  |  |
| Polyether ketone resin (2-2) | Parts by mass |  |  |  |  |  |
| Polyether ketone resin (2-3) | Parts by mass |  |  |  |  |  |
| Fluororesin (1-1) | Parts by mass | 20 | 20 | 20 | 20 | 20 |
| Fluororesin (1-2) | Parts by mass |  |  |  |  |  |
| Fluororesin (2) | Parts by mass |  |  |  |  |  |
| Melt viscosity ratio (polyether ketone resin/fluororesin) |  | 1.3 | 1.3 | 1.3 | 1.3 | 1.3 |
| Kneading temperature | °C. | 375 | 375 | 375 | 390 | 375 |
| Sodium content | ppm | 16 | 188 | 35 | 280 | 276 |
| Calcium content | ppm | 7.1 | 2.0 | 18 | 24 | 26 |
| Average dispersed particle size | μm | 0.30 | 0.42 | 0.38 | 0.45 | 4.1 |
| Tensile strength at break | MPa | 103 | 93 | 87 | 74 | 97 |
| Tensile elongation at break | % | 162 | 145 | 139 | 101 | 156 |
| PV limit | kPa·m/s | 1600 | — | — | 1500 | 800 |
| Coefficient of kinetic friction |  | 0.19 | — | — | 0.21 | 0.20 |

TABLE 2

|  |  | Example 4 | Example 5 | Example 6 | Comparative Example 3 | Comparative Example 4 | Comparative Example 5 |
|---|---|---|---|---|---|---|---|
| Polyether ketone resin (1-1) | Parts by mass | 60 |  |  |  |  |  |
| Polyether ketone resin (1-2) | Parts by mass |  | 60 |  |  | 60 |  |
| Polyether ketone resin (1-3) | Parts by mass |  |  |  |  |  |  |
| Polyether ketone resin (1-4) | Parts by mass |  |  |  | 60 |  |  |
| Polyether ketone resin (2-1) | Parts by mass |  |  | 60 |  |  |  |
| Polyether ketone resin (2-2) | Parts by mass |  |  |  |  |  | 60 |
| Polyether ketone resin (2-3) | Parts by mass |  |  |  |  |  |  |
| Fluororesin (1-1) | Parts by mass | 40 | 40 |  | 40 |  |  |
| Fluororesin (1-2) | Parts by mass |  |  |  |  | 40 |  |
| Fluororesin (2) | Parts by mass |  |  | 40 |  |  | 40 |
| Melt viscosity ratio (polyether ketone resin/fluororesin) |  | 1.3 | 1.3 | 0.5 | 1.3 | 1.3 | 0.5 |
| Kneading temperature | °C. | 375 | 375 | 375 | 390 | 390 | 390 |
| Sodium content | ppm | 14 | 155 | 17 | 202 | 203 | 188 |
| Calcium content | ppm | 5.3 | 1.6 | 1.3 | 19 | 18 | 17 |
| Average dispersed particle size | μm | 0.76 | 0.80 | 1.2 | 0.85 | 0.92 | 1.5 |
| Tensile strength at break | MPa | 94 | 88 | 90 | 68 | 69 | 66 |
| Tensile elongation at break | % | 174 | 163 | 169 | 103 | 107 | 99 |
| PV limit | kPa·m/s | 1700 | — | — | 1600 | — | 1000 |
| Coefficient of kinetic friction |  | 0.16 | — | — | 0.17 | — | 0.18 |

TABLE 3

|  |  | Example 7 | Example 8 | Example 9 | Comparative Example 6 | Comparative Example 7 |
|---|---|---|---|---|---|---|
| Polyether ketone resin (1-1) | Parts by mass | 50 |  |  |  |  |
| Polyether ketone resin (1-2) | Parts by mass |  | 50 |  |  |  |
| Polyether ketone resin (1-3) | Parts by mass |  |  |  |  |  |
| Polyether ketone resin (1-4) | Parts by mass |  |  |  | 50 |  |
| Polyether ketone resin (2-1) | Parts by mass |  |  | 50 |  |  |
| Polyether ketone resin (2-2) | Parts by mass |  |  |  |  | 50 |
| Polyether ketone resin (2-3) | Parts by mass |  |  |  |  |  |
| Fluororesin (1-1) | Parts by mass | 50 | 50 |  | 50 |  |
| Fluororesin (1-2) | Parts by mass |  |  |  |  |  |
| Fluororesin (2) | Parts by mass |  |  | 50 |  | 50 |
| Melt viscosity ratio (polyether ketone resin/fluororesin) |  | 1.3 | 1.3 | 0.5 | 1.3 | 0.5 |
| Kneading temperature | °C. | 375 | 375 | 375 | 390 | 390 |
| Sodium content | ppm | 12 | 132 | 15 | 168 | 153 |
| Calcium content | ppm | 4.3 | 1.4 | 1.2 | 18 | 17 |
| Average dispersed particle size | μm | 1.1 | 1.3 | 1.9 | 1.8 | 2.5 |
| Tensile strength at break | MPa | 84 | 79 | 85 | 59 | 57 |
| Tensile elongation at break | % | 215 | 203 | 212 | 146 | 138 |

TABLE 3-continued

|  |  | Example 7 | Example 8 | Example 9 | Comparative Example 6 | Comparative Example 7 |
|---|---|---|---|---|---|---|
| PV limit | kPa · m/s | 1800 | — | — | 1300 | 900 |
| Coefficient of kinetic friction |  | 0.15 | — | — | 0.17 | 0.16 |

TABLE 4

|  |  | Example 10 | Comparative Example 8 |
|---|---|---|---|
| Polyether ketone resin (1-1) | Parts by mass |  |  |
| Polyether ketone resin (1-2) | Parts by mass |  |  |
| Polyether ketone resin (1-3) | Parts by mass |  |  |
| Polyether ketone resin (1-4) | Parts by mass |  |  |
| Polyether ketone resin (2-1) | Parts by mass | 40 |  |
| Polyether ketone resin (2-2) | Parts by mass |  |  |
| Polyether ketone resin (2-3) | Parts by mass |  | 40 |
| Fluororesin (1-1) | Parts by mass |  |  |
| Fluororesin (1-2) | Parts by mass |  |  |
| Fluororesin (2) | Parts by mass | 60 | 60 |
| Melt viscosity ratio (polyether ketone resin/fluororesin) |  | 0.5 | 0.5 |
| Kneading temperature | ° C. | 375 | 390 |
| Sodium content | ppm | 11.2 | 124 |
| Calcium content | ppm | 0.72 | 11.2 |
| Average particle size | μm | 1.9 | 4.8 |
| Tensile strength at break | MPa | 68 | 43 |
| Tensile elongation at break | % | 250 | 162 |
| PV limit | kPa · m/s | 1700 | 700 |
| Coefficient of kinetic friction |  | 0.14 | 0.16 |

The invention claimed is:

1. A resin composition comprising:
    an aromatic polyether ketone resin (I); and
    a fluororesin (II),
    the composition having a sodium content of 11.2 ppm or more and 188 ppm or less relative to the composition and a calcium content of 0.72 ppm or more and 18 ppm or less relative to the composition,
    wherein the aromatic polyether ketone resin (I) is polyetheretherketone,
    the fluororesin (II) is a copolymer of tetrafluoroethylene and a perfluoroethylenic unsaturated compound represented by the following formula (1):

$$CF_2=CF-Rf^1 \qquad (1)$$

wherein $Rf^1$ is $-CF_3$ or $-ORf^2$, where $Rf^2$ is a C1-C5 perfluoroalkyl group, the composition has a tensile strength at break of 68 to 103 MPa and a tensile elongation at break of 139% to 250%, and
    the fluororesin (II) is dispersed in the form of particles in the aromatic polyether ketone resin (I), and has an average dispersed particle size of smaller than 3.0 μm.

2. The resin composition according to claim 1,
    wherein the aromatic polyether ketone resin (I) and the fluororesin (II) satisfy a mass ratio (I):(II) of 99:1 to 30:70.

3. The resin composition according to claim 1,
    wherein the fluororesin (II) has a melting point of 230° C. to 350° C.

4. A pellet which is obtained by molding the resin composition according to claim 1.

5. The pellet according to claim 4, with a lubricant being added thereto after the molding.

6. A molded article which is formed from the resin composition according to claim 1.

7. An electric wire which is covered with the resin composition according to claim 1.

8. A method for producing the resin composition according to claim 1, comprising:
    selecting combination of an aromatic polyether ketone resin (I) and a fluororesin (II) so as to satisfy a sodium content of 11.2 ppm or more and 188 ppm or less relative to the composition and a calcium content of 0.72 ppm or more and 18 ppm or less relative to the composition; and
    kneading the aromatic polyether ketone resin (I) and the fluororesin (II).

9. A molded article which is formed from the pellet according to claim 4.

10. An electric wire which is covered with the pellet according to claim 4.

* * * * *